United States Patent [19]
Laurie et al.

[11] 4,095,560
[45] Jun. 20, 1978

[54] BALED TIRE PROCESS

[76] Inventors: Albert F. Laurie, 7239 N. Chase, Portland, Oreg. 97217; G. W. Bunch, 11775 SW. Warner, Tigard, Oreg. 97223

[21] Appl. No.: 663,366

[22] Filed: Mar. 3, 1976

Related U.S. Application Data

[62] Division of Ser. No. 574,595, May 5, 1975.

[51] Int. Cl.² .................... A01K 61/00; E02B 3/04
[52] U.S. Cl. ............................. 119/3; 61/3; 61/4; 100/12; 206/304
[58] Field of Search ............... 61/3, 4, 5, 48; 114/219; 206/304, 386, 497, 499, 597; 100/12, 98; 119/2, 3, 4

[56] References Cited

U.S. PATENT DOCUMENTS

| | | | |
|---|---|---|---|
| 3,675,626 | 7/1972 | Down | 119/4 |
| 3,928,701 | 12/1975 | Roehner | 61/4 X |
| 3,951,384 | 4/1976 | Hildreth, Jr. | 114/219 X |

FOREIGN PATENT DOCUMENTS

| | | | |
|---|---|---|---|
| 55,326 | 6/1935 | Norway | 61/4 |

OTHER PUBLICATIONS

Washington Herald of Jul. 14, 1933.

*Primary Examiner*—Jacob Shapiro
*Attorney, Agent, or Firm*—Klarquist, Sparkman, Campbell, Leigh, Hall & Whinston

[57] ABSTRACT

Discarded rubber automotive tires are processed into bales for disposal and use as landfill, fish habitats and other purposes by compressing a stack of such tires endwise into a compact annular bale and then securing the bale with ties at circumferentially spaced locations thereon. Preferably during compression of the stack, it is slit lengthwise from end to end at multiple circumferential locations between the wires. The resulting slits extend inwardly from the outer toward the inner periphery of the bale but terminate short of the inner tire bead and rim to permit the escape of air and water from the annular interior spaces of the tires and yet maintain the integrity of the bale. The compressed, tied and slit baled product is particularly useful in forming artificial reefs in bodies of water for use as fish habitats because of its lack of buoyancy and resulting ease and accuracy of placement. By tying the bale with one non-corrodible tie and cutting the others or permitting such others to corrode apart when in place, the baled tires fan out to form a particularly effective fish habitat.

9 Claims, 8 Drawing Figures

U.S. Patent — June 20, 1978 — 4,095,560
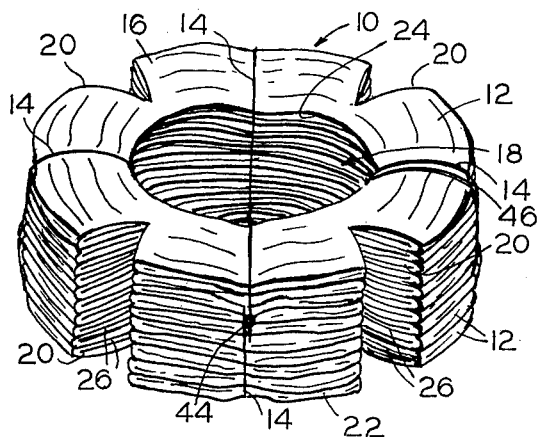
FIG. 1
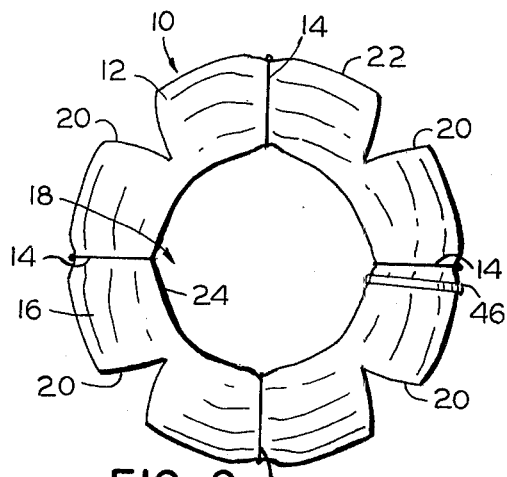
FIG. 2
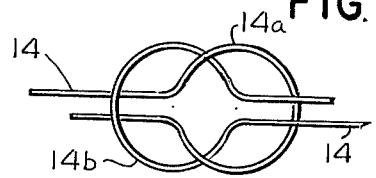
FIG. 3
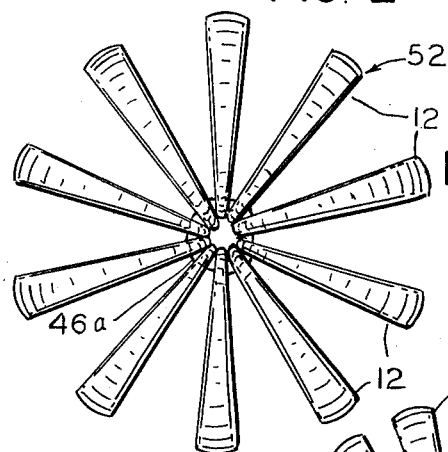
FIG. 8
FIG. 7
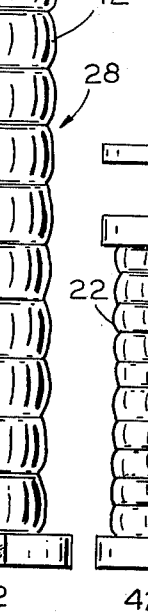
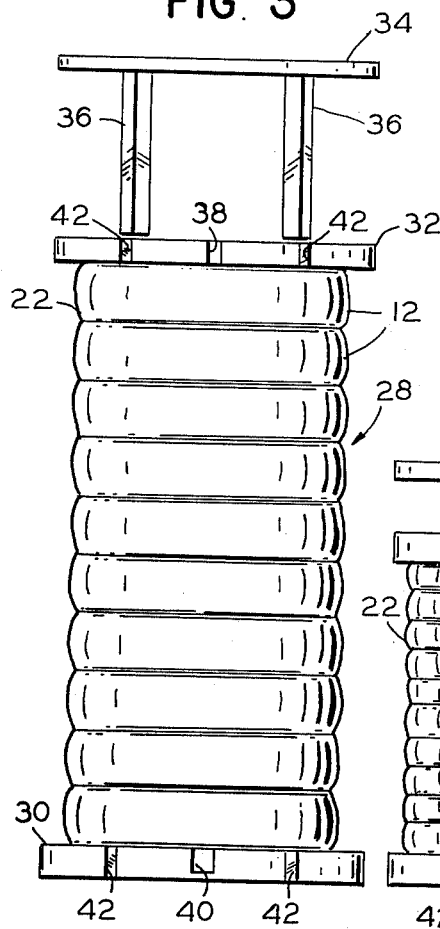
FIG. 4
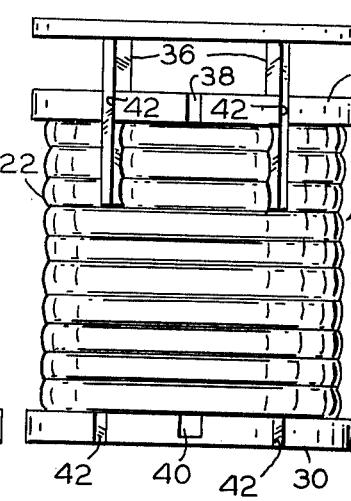
FIG. 6
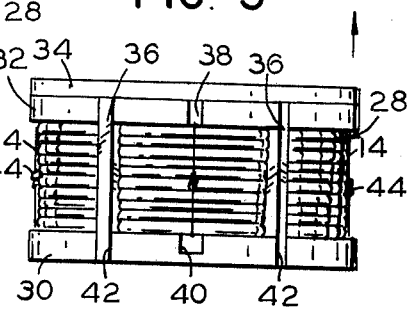
FIG. 5

BALED TIRE PROCESS

BACKGROUND OF THE INVENTION

1. Field of the Invention

The present invention relates to the disposal of discarded rubber automotive tires and more particularly to a method of processing such tires for disposal and to the resulting product which is especially useful as an artifical fish reef.

2. Description of the Prior Art

Rubber automotive tires are a major disposal problem in the United States and most other developed countries of the world. It is estimated that nearly 200 million old tires are discarded yearly in the United States alone. Commonly such tires are discarded at organized trash dumps. However, many dumps do not willingly accept tires because of the large space they occupy and because there they remain a disposal problem. Many other used tires are simply discarded by unthinking persons in lakes, streams, and in the open countryside where they remain an unsightly blight indefinitely.

Other means of disposal include burning, but the dense smoke produced by the burning tires creates an air pollution problem.

Machines have been devised for cutting the tires into small pieces to reduce their volume and make them suitable for use as landfill. However, such machines are expensive, have insufficient capacity, and are not available in sufficient quantities to make any appreciable impact on the millions of discarded tires in existence.

Another approach to the problem has involved the compaction of stacks of tires into small compressed bales secured by baling wire, with the resulting bales being used as landfill. Machines for accomplishing this have been in production for several years.

Government fisheries agencies have found an additional use for such bales and individual tires in forming artifical reefs in salt water which have served successfully as fish habitats. However, such bales and tires are buoyant and therefore difficult to sink accurately and maintain at desired locations without drifting. To counter the effects of such buoyancy, the bales have been filled with concrete or other ballast. While this has solved the buoyancy problem, the ballast-filled bales are expensive and time-consuming to produce and are difficult to handle because of their great weight. Moreover, the air and polluted water trapped within the tire carcasses inhibits compaction of a stack of such tires in forming the bale for use as either landfill or fish habitats and the entrapped water creates a water pollution problem when the bales are placed in water.

Accordingly, there is a need for an improved baled tire product for use as fish habitats, landfill and other desired purposes and for an improved method of processing discarded tires to form the bales.

SUMMARY OF THE INVENTION

In accordance with the present invention, discarded tires are arranged in a stack, and the stack is compressed end to end and tied to form a compact bale as before. However, as the bale is compressed, or shortly thereafter, it is slit lengthwise end to end and inwardly from the outer circumference toward the inner circumference to form vee-shaped openings between the wire positions on the bale and without completely severing the bale so that entrapped air and water can escape from the interior spaces of the tire carcasses. Not only is greater compaction of the bale possible using this method, but the resulting baled, tied and slit tire product can be used successfully as fish reef material. No longer need the baled tire product be filled with concrete or other heavy material. The improved bale has been found to sink in salt or fresh water directly to the spot desired and to retain its position without drifting when exposed to subsurface currents.

Also in accordance with the invention, an especially effective fish habitat is provided by severing all but one of the ties for the bale, either before dumping the bale into the water or after, at the reef site, to cause the bale to fan out in a radiant pattern about the one remaining tie, made of a non-corrodible material.

Another primary object of the invention is to provide an improved baled tire product having a greater usefulness than prior such products.

Another principal object of the invention is to provide a baled rubber tire product which is more economical and effective for use in forming artificial fish reefs than prior baled tire products.

The foregoing objects, features and advantages of the present invention will become more apparent from the following detailed description which proceeds with reference to the accompanying drawing.

BRIEF DESCRIPTION OF THE DRAWING

In the drawings:

FIG. 1 is a perspective view of a baled tire product in accordance with the invention;

FIG. 2 is a top view of the baled tire product of FIG. 1;

FIGS. 3, 4 and 5 illustrate a method of forming the baled tire products of FIG. 1;

FIG. 6 illustrates a method of securing the opposite ends of a baling wire of the product;

FIG. 7 is an elevational view of one form of artificial fish reef in accordance with the invention; and FIG. 8 is a plan view of another form of artificial fish reef in accordance with the invention.

DETAILED DESCRIPTION

Tire Bale Product

With reference to the drawings, FIGS. 1 and 2 show a baled tire product 10 in accordance with the invention. The bale 10 includes a stack of, say, 10 or so rubber tire carcasses 12 of approximately the same diameter that have been stacked in axial alignment with one another and compressed into the compact annular bale shown. The bale is secured in its compressed condition by a series of baling wires or ties 14 which encircle the resulting annulus 16 of the bale at circumferentially spaced positions. More specifically, each baling wire 14 extends through the center opening 18 of the bale, about its opposite ends and then lengthwise along the outside of the bale where the opposite ends of the wire are secured at 44. Alternatively metal or plastic straps or other ties could be used to secure the bale.

The bale also includes a series of vee-shaped openings 20 extending from end to end of the bale between ties 14. Openings 20 extend generally radially inwardly of the bale from the outer periphery 22 at the tire treads toward the inner periphery or rim 24, terminating short of rim 24 and its adjacent bead at approximately the edge of the treads so as to maintain the integrity of the bale while at the same time permitting the escape of entrapped air and water from the inner annular spaces 26 of each of the compressed tire carcasses.

It has been found that a stack of passenger car tires approximately 5 feet or more in height can be compressed into a bale less than 12 inches high using suitable compression equipment.

METHOD OF FORMING BALE

The bale may be formed, for example, by piling a quantity of passenger car tires or a quantity of truck tires in a vertical stack 28 as shown in FIG. 4 with their center openings or axes aligned on a base plate 30. The number of tires used will depend on the tread widths of the tires and the capacity of the baling machinery.

The stack is then compressed as shown in FIG. 5 by moving a movable pressure plate 32 positioned above the stack downwardly against the upper end of the stack and continuing such movement under the influence of a hydraulic ram or other pressure-applying means to compress the stack.

During compression of the stack a second movable plate 34 positioned above the pressure plate 32 and carrying downwardly projecting tire-slitting knives 36 travels downwardly in relation to pressure plate 32 so that knives 36 move through radial slots 42 in plate 32 into slitting contact with the stack. When the knife plate 34 engages pressure plate 32, the two plates continue downwardly together with plates 32 compressing the stack as knives 36 slit through the stack. This continues until the stack is compressed to the maximum. Knives 36 are sufficiently long that when pressure plate 32 has compressed stack 28 to the maximum, such knives have slit completely through the compressed stack from end to end thereof, forming the radial vee-shaped openings 20 shown in FIG. 1.

With the stack maintained in its compressed condition as shown in FIG. 5, initially straight but flexible baling wires 14, with loops 14a, 14b (FIG. 6) provided at their opposite ends, or other suitable ties, are drawn around the compressed stack at positions between the knives 36. These positions are dictated by additional radial slots 38, 40 provided in the movable pressure plate 32 and base plate 30. Such slots enable each wire or other tie to be fed around the bale and down through the center opening of the stack. The loops at the opposite ends of each wire 14 enable the ends to be quickly and easily looped together to form a square knot 44 in the manner shown in FIG. 6 to secure the bale in its compressed condition. After securing the bale with ties 14, the pressure plate 32 and knife plate 34 are withdrawn upwardly from the stack permitting removal of the completed bale from the base plate 30, ready for use in a desired manner.

Alternatively, the slits or openings 20 could be formed in the bale following compression of the stack and after securing the bale with ties 14. This could be done either by using the illustrated knife plate 34 or by moving the compressed and secured but unslit bale to a second, cutting station where power-operated knives or saws would perform the cutting operation.

PRODUCT UTILITY

The completed bale in the form shown in FIGS. 1 and 2 is ready for transport to a landfill or to a dumping site for use as a fish habitat. For use as fish habitats the tire bales as shown in FIG. 1 are transported to a body of water, which may be either salt or fresh water, where the artificial fish reef is to be formed. Bales to be used for this purpose are provided with at least one tie 14 made of a non-corrodible material such as a suitable metal alloy or plastic. Such tie is also preferably secured more loosely about the bale than the other ties. Alternatively, where ties 14 are made of a corrodible metal, an extra overtie 46, as shown in FIGS. 1 and 2, of nylon rope or plastic strap is secured loosely about the bale near one of the ties 14. Then either before or after the bale 10 is dumped overboard, all ties 14 except one non-corrodible one, or all ties except overtie 46 where an overtie is used, are severed to cause the bale to fan open as shown in FIG. 7 or FIG. 8.

When the bales are dropped overboard before severing ties 14, they descend directly to the bottom of the body of water, resting on the bottom in the manner shown in FIG. 1. They will remain in such condition until the corrodible ties are severed, either by a diver sent down to the bales for this purpose or by the corrosive action of the water. About ninety days are required for a steel tie strap to rust out in salt water. In either case, when the ties 14 part, the bale fans open about the single remaining tie 46 to form the artificial fish reef 50 shown in FIG. 7. Thus many tire surfaces are exposed on which barnacles, coral and other marine life rapidly build up to form an effective fish habitat. It has been found that a noticeable buildup starts within 6 hours after the bale is deposited. Each such reef 50 remains unmoved by underwater currents since such currents can pass readily in any direction through the tire-formed reef. Moreover, the lowermost two tires 12a, 12b of the reef rapidly become buried in silt to anchor the reef securely in place.

When the bale 10 has all but one of its ties cut before it is dumped overboard, the bale fans open about a single tie 46a to form a reef 52 having the full 360° radiant pattern shown in FIG. 8. The resulting reef 52 is dumped overboard so that the reef comes to rest on the floor of the body of water with the tires 12 resting on their treads. Thus the radiant pattern of FIG. 8 represents a plan view of the reef in place. The lower portions of the tires 12 of such reef soon become buried in silt, anchoring the reef in place. Such radiant reefs 52 can be arranged in groups along the ocean floor with additional such reefs piled on top of the lowermost ones in pyramid fashion.

Whether the bale is opened up before or after sinking it, the bale will drop directly to the desired reef site without drifting because of its lack of buoyancy. A bale formed of nine or ten passenger car or light truck tires weighs from about 28 to 31 pounds in salt water. Experiments have shown that a bale must weigh at least 25 pounds in such water to withstand the strongest of underwater currents. Therefore the bales as described are not subject to drifting and will remain in place even in the absence of the silting effect mentioned.

Using the described method, it has been found that a stack of approximately ten passenger car tires can be compressed into a bale of approximately 8 to 12 inches high. Truck tires may be used to form a baled tire product in the manner described. However, it has been found that each stack should contain either light truck and passenger car tires or all truck tires, ranging in rim size from 18 to 24½ inches, to facilitate forming the bale.

Having illustrated and described what is presently a preferred embodiment of the process and products of the invention, it should be apparent to those skilled in the art that the same permit of modification in arrangement, detail and procedure. We claim as our invention all such modifications as come within the true spirit and scope of the following claims.

We claim:

1. The method of forming an artificial fish reef comprising:

compressing a stack of rubber tires endwise into a compact bale and securing said bale in its compressed condition with a series of ties at spaced intervals around the annular circumference thereof, slitting said bale lengthwise between said ties with each slit extending inwardly from the outer circumference of said bale and ending short of the inner circumference of said bale, severing all except one of said ties to cause said compressed bale to fan open about said one tie and said tires to radiate from said one tie.

2. The method of claim 1 wherein said one tie comprises a non-corrodible material.

3. The method of claim 1 including transporting the tied bale to a reef placement site before severing said ties.

4. The method of claim 3 including severing said ties before depositing said bale in a body of water at said reef placement site.

5. The method of claim 3 including severing said ties after depositing said bale in a body of water at said reef placement site.

6. The method of claim 1 including compressing a stack of at least nine said tires to form said bale.

7. A method of processing rubber automotive tires for disposal and for use as landfill, fish habitats and other purposes comprising the steps:

assembling a plurality of said tires into an axially aligned stack, compressing said stack endwise into a compact annular bale, while maintaining said bale under compression, encircling the annulus of said bale with baling ties at circumferentially spaced locations thereon and fastening together the opposite ends of each said tie to secure said bale in its compacted condition, and at multiple positions between said ties slitting said bale lengthwise from end to end and from the outer circumference inwardly toward the inner circumference thereof but stopping short of said inner circumference to permit the escape of air and water from the annular interior spaces of said compressed baled tires and yet maintain the integrity of said bale.

8. The method of claim 7 wherein said slitting occurs during the compression of said stack.

9. The method of claim 7 wherein said slitting is completed before said ties are applied to said bale.

* * * * *